US012603447B2

(12) United States Patent
Ashibu

(10) Patent No.: US 12,603,447 B2
(45) Date of Patent: Apr. 14, 2026

(54) BOARD-TO-BOARD ELECTRICAL CONNECTOR WITH CONTACTS HAVING A SOLDERABLE MOUNTING PART FOR A FIRST BOARD AND A SPRING PIECE CONTACTING A SECOND BOARD

(71) Applicant: Japan Aviation Electronics Industry, Ltd., Tokyo (JP)

(72) Inventor: Kenta Ashibu, Tokyo (JP)

(73) Assignee: Japan Aviation Electronics Industry, Ltd., Tokyo (JP)

(*) Notice: Subject to any disclaimer, the term of this patent is extended or adjusted under 35 U.S.C. 154(b) by 269 days.

(21) Appl. No.: 18/384,945

(22) Filed: Oct. 30, 2023

(65) Prior Publication Data

US 2024/0178593 A1 May 30, 2024

(30) Foreign Application Priority Data

Nov. 30, 2022 (JP) ................................ 2022-191459

(51) Int. Cl.
*H01R 12/71* (2011.01)
*H01R 12/57* (2011.01)
(Continued)

(52) U.S. Cl.
CPC ........... *H01R 12/716* (2013.01); *H01R 12/57* (2013.01); *H01R 12/707* (2013.01); *H01R 12/712* (2013.01); *H01R 12/714* (2013.01); *H01R 12/73* (2013.01); *H01R 13/02* (2013.01); *H01R 13/15* (2013.01); *H01R 13/17* (2013.01); *H01R 13/40* (2013.01); *H01R 13/415* (2013.01); *H01R 12/55* (2013.01); *H01R 12/62* (2013.01); *H01R 12/7005* (2013.01); *H01R 12/7011* (2013.01);
(Continued)

(58) Field of Classification Search
CPC .... H01R 12/716; H01R 12/57; H01R 12/707; H01R 12/712; H01R 12/714; H01R 12/73; H01R 13/02; H01R 13/15; H01R 13/17; H01R 13/40; H01R 13/415; H01R 12/55; H01R 12/62; H01R 12/7005; H01R 12/7011; H01R 12/71; H01R 13/405; H01R 13/42
See application file for complete search history.

(56) References Cited

U.S. PATENT DOCUMENTS

2021/0075178 A1* 3/2021 Hwang ................ H01R 13/506

FOREIGN PATENT DOCUMENTS

CN 2736972 Y 10/2005
CN 107785677 A * 3/2018 ........... H01R 12/718

* cited by examiner

*Primary Examiner* — Justin M Kratt
(74) *Attorney, Agent, or Firm* — Lippes Mathias LLP

(57) ABSTRACT

A spring piece of each contact includes a first spring part extending between a contact part and a fixed part, and a second spring part extending downward from the contact part. In a plurality of contacts, when a board-to-board connector is mounted on a main board, the second spring part is separated from the main board. In the plurality of contacts, when the spring piece receives a load from a sub-board and thereby the contact part is displaced downward, the first spring part is deformed, and further the second spring part is deformed in contact with the main board. In at least any one of the plurality of contacts, after the load is removed and thereby the contact part is displaced upward, the second spring part remains in contact with the main board.

5 Claims, 9 Drawing Sheets

(51) Int. Cl.

| | |
|---|---|
| ***H01R 12/70*** | (2011.01) |
| ***H01R 12/73*** | (2011.01) |
| ***H01R 13/02*** | (2006.01) |
| ***H01R 13/15*** | (2006.01) |
| ***H01R 13/17*** | (2006.01) |
| ***H01R 13/40*** | (2006.01) |
| ***H01R 13/415*** | (2006.01) |
| *H01R 12/55* | (2011.01) |
| *H01R 12/62* | (2011.01) |
| *H01R 13/405* | (2006.01) |
| *H01R 13/42* | (2006.01) |

(52) U.S. Cl.

CPC ............ *H01R 12/71* (2013.01); *H01R 13/405* (2013.01); *H01R 13/42* (2013.01)

--Prior Art--

BOARD-TO-BOARD ELECTRICAL CONNECTOR WITH CONTACTS HAVING A SOLDERABLE MOUNTING PART FOR A FIRST BOARD AND A SPRING PIECE CONTACTING A SECOND BOARD

INCORPORATION BY REFERENCE

This application is based upon and claims the benefit of priority from Japanese patent application No. 2022-191459, filed on Nov. 30, 2022, the disclosure of which is incorporated herein in its entirety by reference.

BACKGROUND

The present disclosure relates to a board-to-board connector.

As shown in FIG. 9 of this application, Patent Literature 1 (the description of Chinese Utility Model No. 2736972) discloses a contact 100 for a board-to-board connector. The contact 100 includes a soldering part 101 to be soldered to a circuit board, a connecting part 102 to be held by a housing, and an elastic piece 104 having a contact part 103 in this recited order.

SUMMARY

The contact 100 of Patent Literature 1 described above is configured to reduce the transmission path length from the contact part 103 to the soldering part 101 in order to improve the transmission characteristics. Accordingly, the length of the elastic piece 104 is not sufficiently long. This raises the possibility that the elastic piece 104 is plastically deformed when the contact part 103 is lowered by a predetermined number of strokes as the elastic piece 104 is deformed. If the elastic piece 104 is plastically deformed, plastic strain remains in the elastic piece 104 even after a load on the elastic piece 104 is removed, which hinders the contact part 103 from returning to its initial position.

An object of the present disclosure is to provide a technique to bring the position of a contact part when a load on a contact is removed closer to its original position.

According to an aspect of the present invention, there is provided a board-to-board connector mounted on a first board and interposed between the first board and a second board to electrically connect a plurality of first electrode pads of the first board and a plurality of second electrode pads of the second board, respectively, the board-to-board connector including a plurality of contacts; and a housing holding the plurality of contacts, wherein the housing includes a housing lower surface configured to be opposed to the first board and a housing upper surface configured to be opposed to the second board, each contact includes a fixed part to be fixed to the housing, a mounting part projecting from the fixed part and solderable to a corresponding first electrode pad, and a spring piece extending from the fixed part and having a contact part configured to come into contact with a corresponding second electrode pad, the spring piece of each contact includes a first spring part extending between the contact part and the fixed part, and a second spring part extending from the contact part in a direction of viewing the housing lower surface from the housing upper surface, in the plurality of contacts, when the board-to-board connector is mounted on the first board, the second spring part is separated from the first board, in the plurality of contacts, when the spring piece receives a load from the second board and thereby the contact part is displaced in the direction of viewing the housing lower surface from the housing upper surface, the first spring part is deformed, and the second spring part is deformed in contact with the first board, and in at least any one of the plurality of contacts, after the load is removed and thereby the contact part is displaced in a direction of viewing the housing upper surface from the housing lower surface, the second spring part remains in contact with the first board.

According to the present disclosure, the position of a contact part when a load on a contact is removed is brought closer to its original position.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiment

An embodiment of the present disclosure will be described hereinafter with reference to FIGS. 1 to 7.

Figure 1:
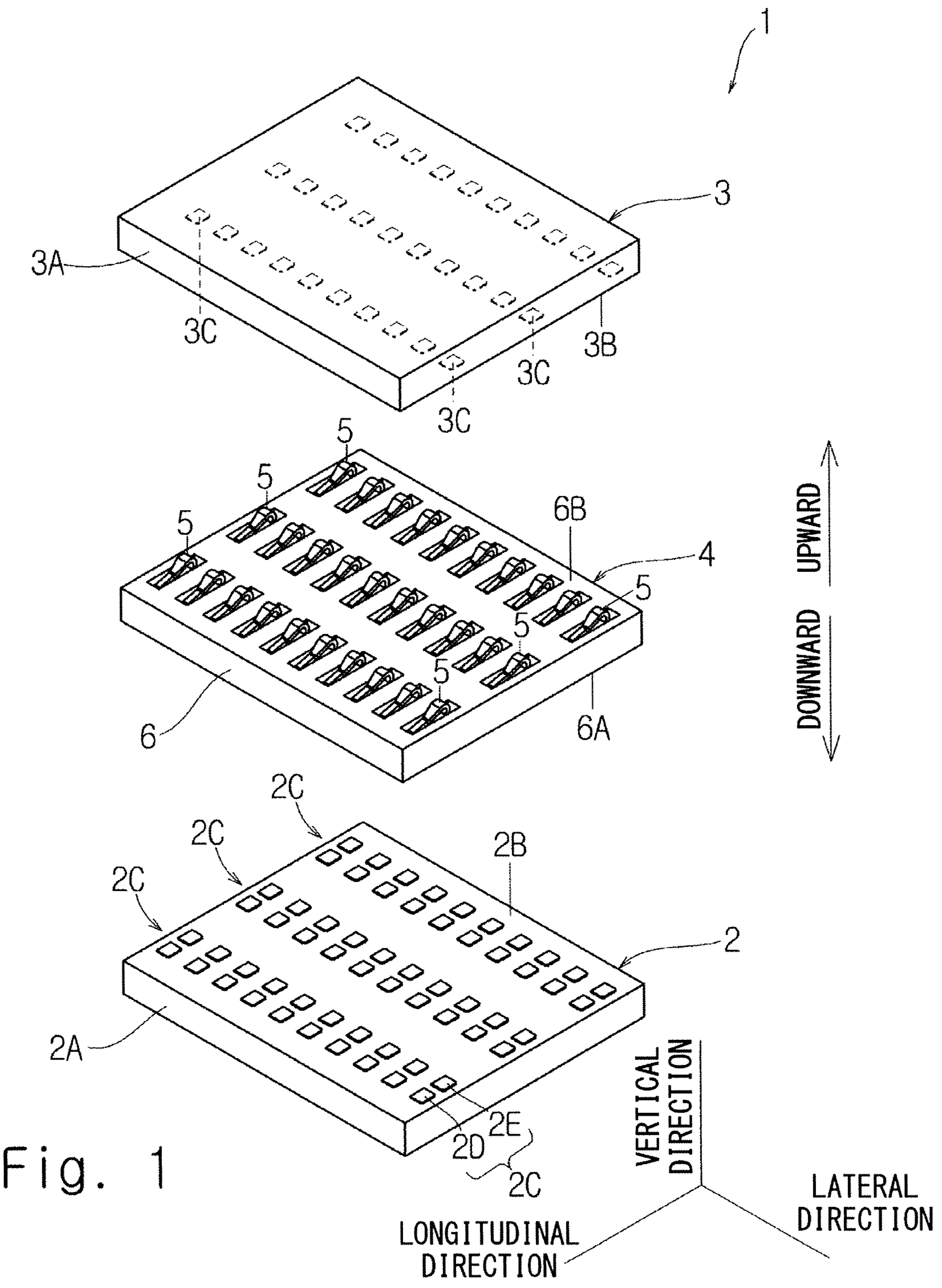
FIG. 1 is a perspective view of electronic equipment.

FIG. 1 shows electronic equipment 1. As shown in FIG. 1, the electronic equipment 1 includes a main board 2 (first board), a sub-board 3 (second board), and a board-to-board connector 4.

The main board 2 includes a board main body 2A and a plurality of main electrode pad pairs 2C (first electrode pads) disposed on a connector mounting surface 2B of the board main body 2A. Each of the main electrode pad pairs 2C includes continuous connection pads 2D and temporary connection pads 2E. The continuous connection pads 2D and the temporary connection pads 2E are electrically continuous with each other. Alternatively, the continuous connection pads 2D and the temporary connection pads 2E may be electrically isolated from each other. The temporary connection pads 2E may be omitted.

The sub-board 3 includes a board main body 3A and a plurality of sub-electrode pads 3C (second electrode pads) disposed on a connector opposed surface 3B of the board main body 3A.

Each of the board main body 2A of the main board 2 and the board main body 3A of the sub-board 3 may be a rigid board such as a paper phenolic board or a glass epoxy board, or a flexible board, for example.

The board-to-board connector 4 is mounted on the connector mounting surface 2B of the board main body 2A of the main board 2. The board-to-board connector 4 is interposed between the main board 2 and the sub-board 3 that are parallel to each other, and thereby electrically connect the plurality of main electrode pad pairs 2C of the main board 2 and the plurality of sub-electrode pads 3C of the sub-board 3, respectively. The direction in which the main board 2, the board-to-board connector 4, and the sub-board 3 overlap is referred to hereinafter as a vertical direction. The direction of viewing the main board 2 from the board-to-board connector 4 is referred to as downward, and the direction of viewing the sub-board 3 from the board-to-board connector 4 is referred to as upward. The upward, downward and vertical directions should not be interpreted as limiting the position of the board-to-board connector 4 during use of the board-to-board connector 4.

The board-to-board connector 4 includes a plurality of contacts 5 that is made of metal, and a housing 6 that is made of insulating resin and accommodates the plurality of contacts 5.

The housing 6 is in a rectangular flat plate shape when viewed from above. The housing 6 include a housing lower surface 6A facing downward and a housing upper surface 6B facing upward.

The plurality of contacts 5 are accommodated in the housing 6 in the same orientation. The longitudinal direction and the lateral direction of each contact 5 when viewed from above are hereinafter referred to simply as a longitudinal direction and a lateral direction, respectively.

Figure 2:
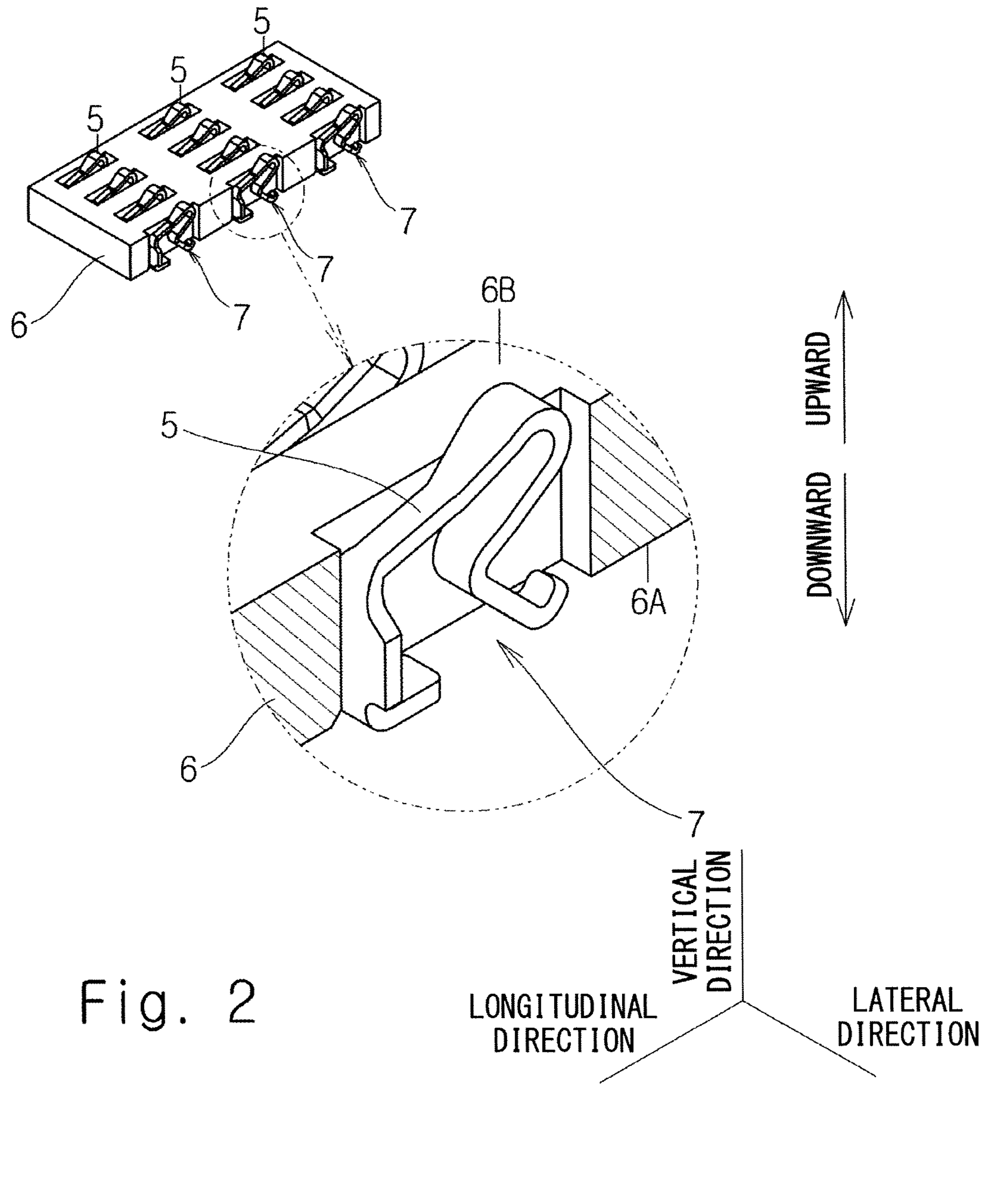
FIG. 2 is a cross-sectional perspective view of a board-to-board connector.

As shown in FIG. 2, the housing 6 has a plurality of cavities 7. Each cavity 7 is formed to vertically penetrate the housing 6. Specifically, each cavity 7 is formed to open in the housing lower surface 6A and the housing upper surface 6B of the housing 6. The plurality of contacts 5 are accommodated in the plurality of cavities 7, respectively.

Figure 3:
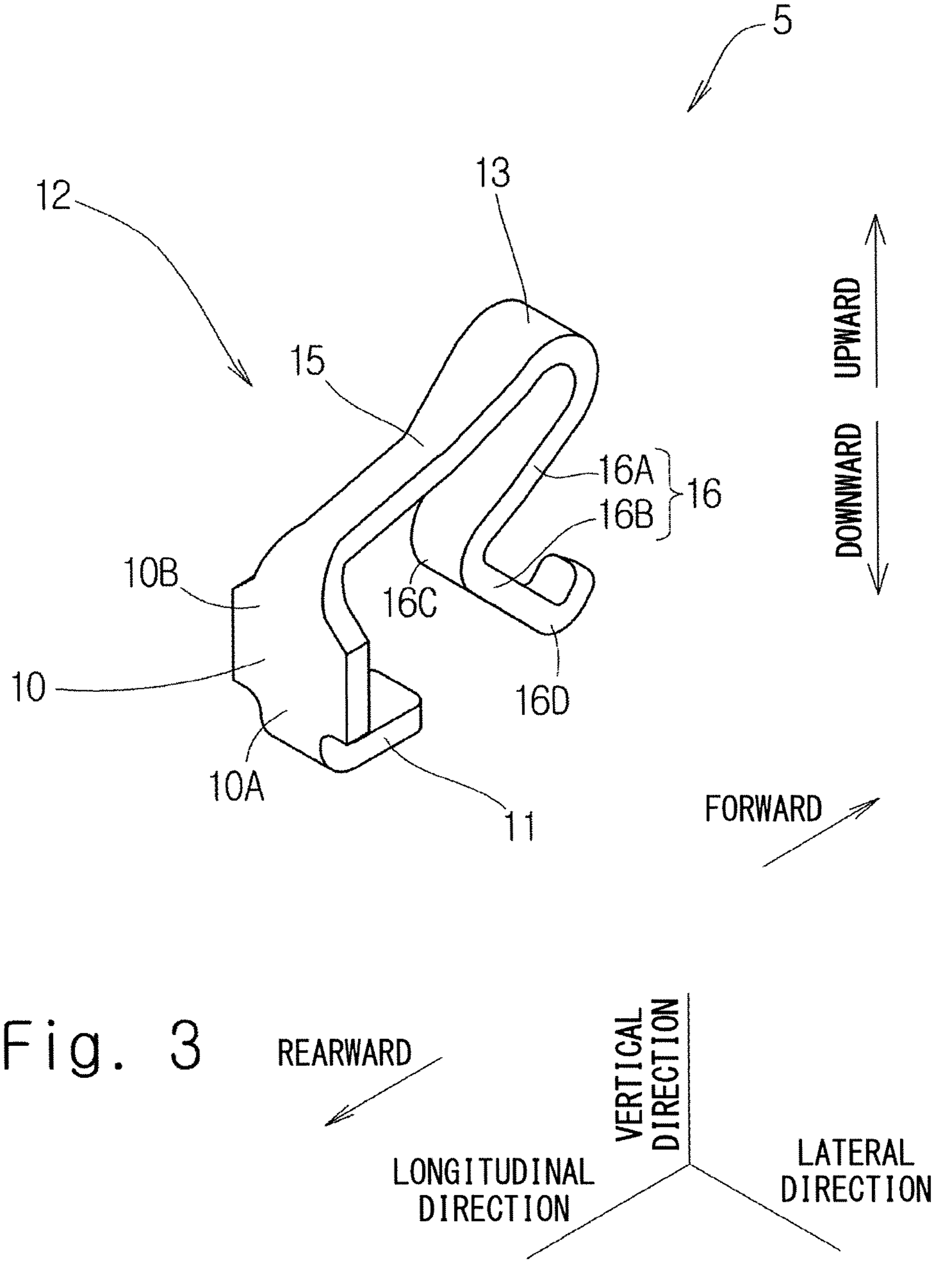
FIG. 3 is a perspective view of a contact.

FIG. 3 shows a perspective view of each contact 5. The plurality of contacts 5 have the same shape, and one contact 5 is described hereinafter as a representative example.

As shown in FIG. 3, the contact 5 is formed in line symmetry when viewed in the longitudinal direction. The contact 5 includes a fixed part 10, a mounting part 11, and a spring piece 12.

The fixed part 10 is a part that is fixed to the housing 6 by press-fitting. The thickness direction of the fixed part 10 is the same as the longitudinal direction.

The mounting part 11 is a part that is solderable to the corresponding continuous connection pad 2D. The mounting part 11 projects from a lower end 10A of the fixed part 10. The thickness direction of the mounting part 11 is the same as the vertical direction. For the convenience of description, the direction in which the mounting part 11 projects from the fixed part 10 is hereinafter referred to as forward, and its opposite direction is referred to as rearward.

The spring piece 12 has a contact part 13 configured to come into contact with the corresponding sub-electrode pad 3C. The spring piece 12 extends from an upper end 10B of the fixed part 10.

The spring piece 12 includes a first spring part 15 and a second spring part 16. The fixed part 10, the first spring part 15, the contact part 13, and the second spring part 16 link together in this recited order in a net of the contact 5.

The first spring part 15 extends between the fixed part 10 and the contact part 13. The first spring part 15 is inclined to slope upward as it goes forward.

The contact part 13 is at a distal end of the first spring part 15. The contact part 13 is curved to convex upward.

The second spring part 16 extends downward from the contact part 13. The second spring part 16 includes an upper inclined part 16A that is inclined to slope downward as it goes rearward, and a lower inclined part 16B that is inclined to slope downward as it goes forward. The upper inclined part 16A and the lower inclined part 16B link together in this recited order sequentially downward from the contact part 13. Between the upper inclined part 16A and the lower inclined part 16B is a bending part 16C that bends to convex rearward. In other words, the upper inclined part 16A and the lower inclined part 16B link together through the bending part 16C. At a lower end of the second spring part 16 is a curved part 16D that is curved to convex downward. The lower end of the second spring part 16 corresponds to a free end of the spring piece 12.

Figure 4:
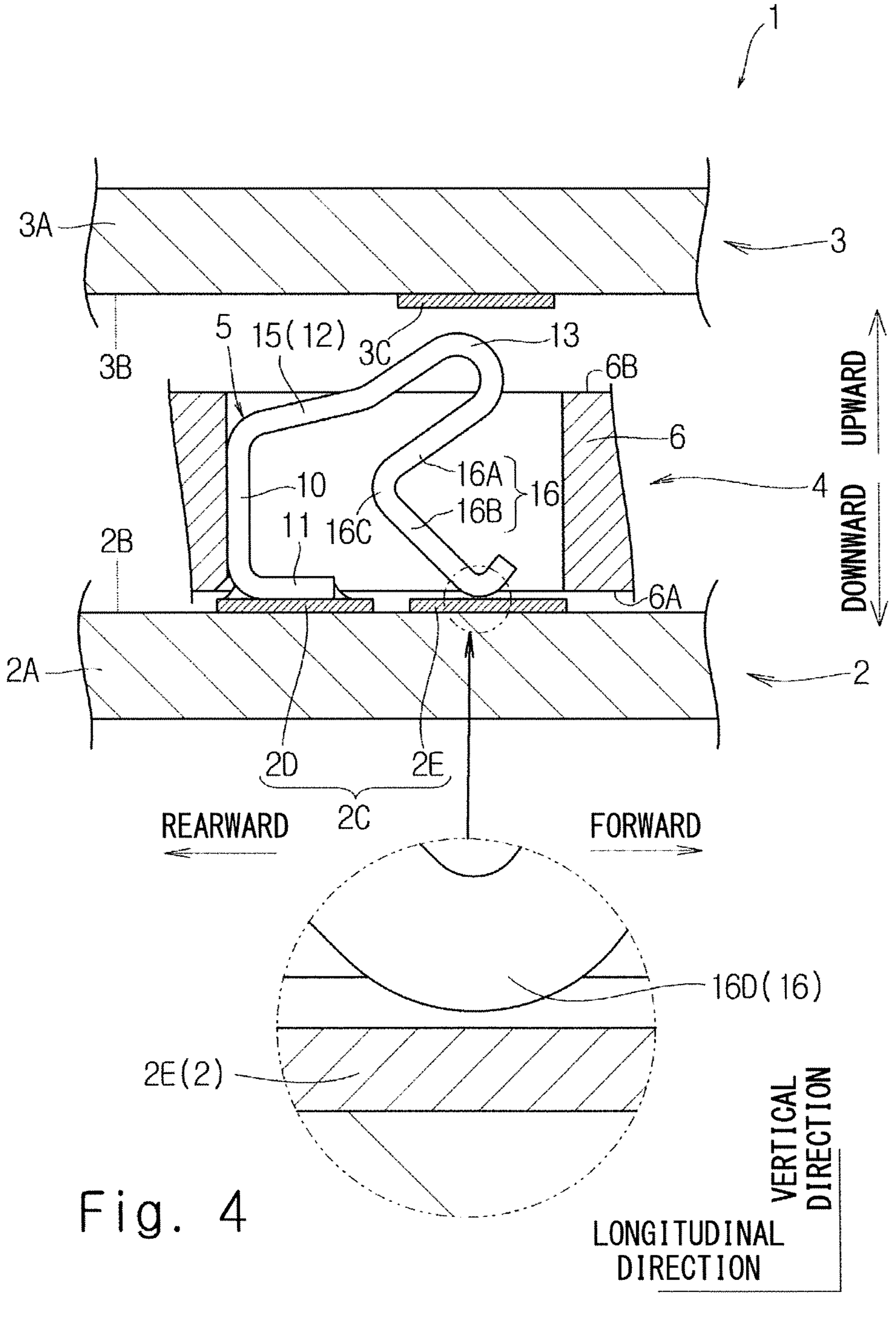
FIG. 4 is a view showing usage of the board-to-board connector.

As shown in FIG. 4, when no load is placed on the spring piece 12, the contact part 13 projects upward beyond the housing upper surface 6B. In this state, the mounting part 11 projects downward beyond the housing lower surface 6A. Likewise, the curved part 16D of the second spring part 16 of the spring piece 12 projects downward beyond the housing lower surface 6A.

The contact 5 is typically manufactured by punching and bending one metal plate. The housing 6 is typically formed by injection molding.

Figure 5:
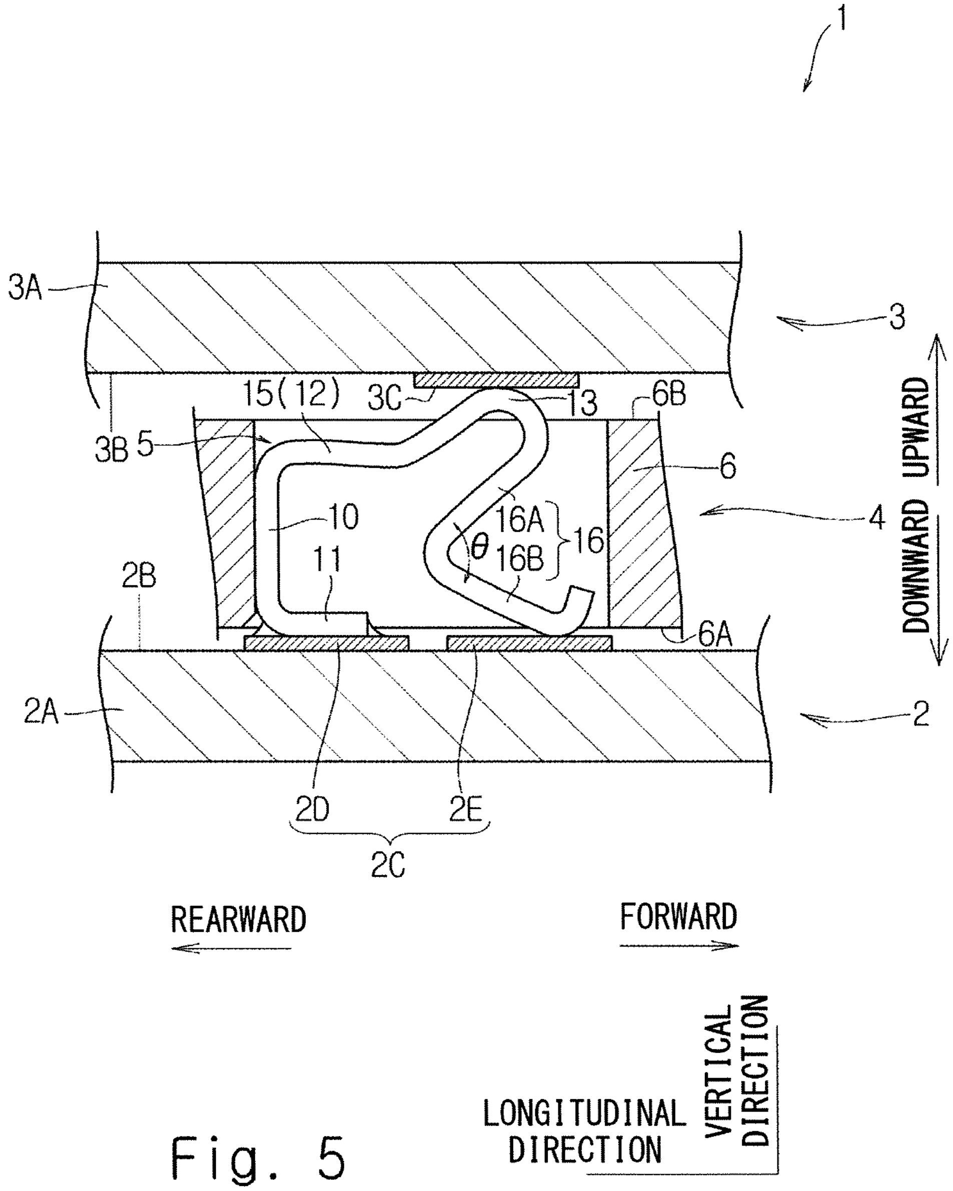
FIG. 5 is a view showing usage of the board-to-board connector.

How to use the board-to-board connector 4 is described hereinafter with reference to FIGS. 4 to 6.

First, the board-to-board connector 4 is mounted on the connector mounting surface 2B of the main board 2. To be specific, the mounting part 11 of each contact 5 is soldered to the corresponding continuous connection pad 2D of the main board 2. FIG. 4 shows the state where the spring piece 12 of each contact 5 has not yet come into contact with the sub-board 3 after each contact 5 is soldered to the corresponding continuous connection pad 2D. In this state, the curved part 16D of the second spring part 16 of the spring piece 12 is slightly separated upward from the corresponding temporary connection pad 2E of the main board 2. In short, when the board-to-board connector 4 is mounted on the main board 2, the second spring part 16 is separated upward from the main board 2. This ensures that the mounting part 11 is closer to the main board 2 than the second spring part 16 is in each contact 5, which allows the mounting part 11 of each contact 5 to be easily soldered to the corresponding continuous connection pad 2D of the main board 2.

To electrically connect the main board 2 and the sub-board 3 in this state, the sub-electrode pad 3C of the sub-board 3 is opposed to the contact part 13 in the vertical direction, and the sub-board 3 is pressed against the board-to-board connector 4. Then, as shown in FIG. 5, the sub-electrode pad 3C comes into contact with the contact part 13, the spring piece 12 receives a downward load from the sub-board 3, and thereby the contact part 13 is displaced downward by a predetermined number of strokes. This number of strokes is typically easily controllable by placing a spacer with a predetermined thickness between the housing 6 of the board-to-board connector 4 and the sub-board 3. When the contact part 13 is displaced downward by a predetermined number of strokes, the first spring part 15 is deformed and also the second spring part 16 is deformed in contact with the main board 2.

To be specific, the first spring part 15 is deformed to bend downward. When the contact part 13 is displaced downward by a predetermined number of strokes as described above, this deformation of the first spring part 15 can be plastic deformation beyond the elastic region.

Further, the second spring part 16 is deformed to be vertically compressed as the contact part 13 is displaced downward and the second spring part 16 comes into contact with the temporary connection pad 2E of the main board 2. To be specific, the second spring part 16 is deformed in such a way that the angle θ between the upper inclined part 16A and the lower inclined part 16B becomes smaller. This deformation of the second spring part 16 is typically elastic deformation since the spring length of the second spring part 16 is sufficiently long.

To electrically disconnect the main board 2 and the sub-board 3, the sub-board 3 is moved upward so that the sub-board 3 is separated upward from the board-to-board connector 4. A load which the spring piece 12 has received from the sub-board 3 is thereby removed, and the contact part 13 is thereby displaced upward as shown in FIG. 6. During this time, the spring piece 12 remains in contact with the main board 2. To be specific, the spring piece 12 remains in contact with the corresponding temporary connection pad 2E of the main board 2. The fact that the spring piece 12 is continuously in contact with the main board 2 even after a load which the spring piece 12 has received from the sub-board 3 is removed means that the elastic restoring force of the second spring part 16 acts upward on the contact part 13. This allows the position of the contact part 13 to be closer to the initial position of the contact part 13 shown in FIG. 4 compared with the case where the spring piece 12 only has the first spring part 15 without having the second spring part 16. For the convenience of description, a height position Z of the contact part 13 is defined hereinbelow. Specifically, as shown in FIG. 6, the height position Z of the contact part 13 is defined as the vertical distance between the housing lower surface 6A of the housing 6 and the top of the contact part 13. Focusing attention on this height position Z, the technical significance of the elastic restoring force of the second spring part 16 will be described hereinafter in detail.

Figure 7:
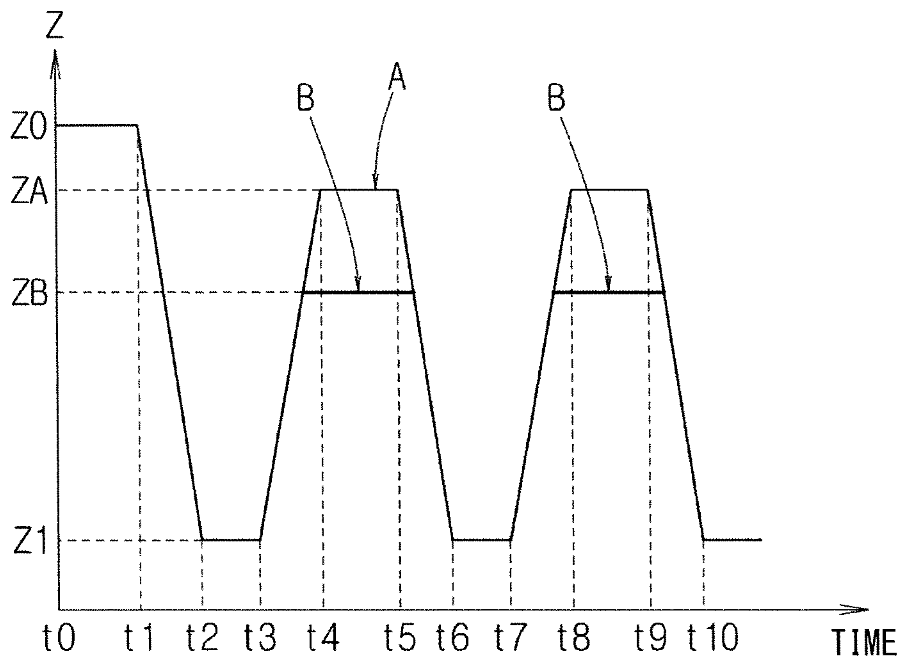
FIG. 7 is a graph showing changes in a height position of a contact part.

FIG. 7 is a graph showing changes in the height position Z of the contact part 13. In the graph of FIG. 7, the horizonal axis indicates time, and the vertical axis indicates the height position Z of the contact part 13. A solid line A in the graph of FIG. 7 corresponds to this embodiment. At time to, the board-to-board connector 4 is mounted on the main board 2. The height position Z at time to is hereinafter referred to as an initial position Z0. Next, at time t1 to t2, the sub-board 3 is pressed against the board-to-board connector 4, and thereby the main board 2 and the sub-board 3 are electrically connected. The height position Z at time t2 is hereinafter defined as a connection position Z1. Then, at time t3 to t4, the sub-board 3 is separated upward from the board-to-board connector 4, and thereby the main board 2 and the sub-board 3 are electrically disconnected. The height position Z at time t4 is defined as a restored position ZA. After that, the boards are connected at time t5 to t6, disconnected at time t7 to t8, and connected at time t9 to t10. After time t4, the height position Z is the connection position Z1 when the boards are connected, and the height position Z is the restored position ZA when the boards are disconnected. In this manner, the height position Z of the contact part 13 alternately changes between the connection position Z1 and the restored position ZA.

If the first spring part 15 is plastically deformed when the main board 2 and the sub-board 3 are electrically connected by pressing the sub-board 3 against the board-to-board connector 4 at time t1 to t2, residual strain remains in the first spring part 15 when the main board 2 and the sub-board 3 are electrically disconnected at time t3 to t4. In short, the first spring part 15 cannot be restored to its original shape. Therefore, the restored position ZA is lower than the initial position Z0.

A heavy line B in the graph of FIG. 7 corresponds to a comparative example of the present disclosure. In this comparative example, the spring piece 12 only has the first spring part 15 without having the second spring part 16. In this comparative example, when the main board 2 and the sub-board 3 are electrically disconnected by separating the sub-board 3 upward from the board-to-board connector 4 at time t3 to t4, the height position Z after disconnection is lower than the restored position ZA. For the convenience of description, the height position Z when the boards are disconnected in this comparative example is defined as a restored position ZB.

The restored position ZA is closer to the initial position Z0 compared with the restored position ZB because of the following reason. In this embodiment, the spring piece 12 remains in contact with the main board 2 even after a load which the spring piece 12 has received from the sub-board 3 is removed as described above. This means that the elastic restoring force of the second spring part 16 acts upward on the contact part 13. Therefore, the height position Z of the contact part 13 is closer to the initial position Z0 in this embodiment compared with the comparative example. Note that, in the state shown in FIG. 6 where the boards are disconnected, the elastic restoring force of the first spring part 15 acts downward on the contact part 13 while the elastic restoring force of the second spring part 16 acts upward on the contact part 13, and the elastic restoring force of the first spring part 15 and the elastic restoring force of the second spring part 16 are balanced out in the vertical direction. If the second spring part 16 is cut off in the state shown in FIG. 6 where the boards are disconnected, the contact part 13 loses the elastic restoring force of the second spring part 16 received from the second spring part 16, and it is lowered by the elastic restoring force of the first spring part 15. As a result, the height position Z of the contact part 13 changes to the restored position ZB shown in FIG. 7.

An embodiment of the present disclosure is described above, and the above-described embodiment has the following features.

As shown in FIGS. 1 to 6, the board-to-board connector 4 is mounted on the main board 2 (first board) and interposed between the main board 2 and the sub-board 3 (second board) to electrically connect the plurality of main electrode pad pairs 2C (first electrode pads) of the main board 2 and the plurality of sub-electrode pads 3C (second electrode pads) of the sub-board 3, respectively.

The board-to-board connector 4 includes the plurality of contacts 5 and the housing 6 that holds the plurality of contacts 5.

The housing 6 includes the housing lower surface 6A configured to be opposed to the main board 2, and the housing upper surface 6B configured to be opposed to the sub-board 3.

Each contact 5 includes the fixed part 10 to be fixed to the housing 6, the mounting part 11 projecting from the fixed part 10 and solderable to the corresponding main electrode pad pair 2C, and the spring piece 12 extending from the fixed part 10 and having the contact part 13 configured to come into contact with the corresponding sub-electrode pad 3C.

The spring piece 12 of each contact 5 includes the first spring part 15 extending between the contact part 13 and the fixed part 10, and the second spring part 16 extending downward from the contact part 13.

In the plurality of contacts 5, when the board-to-board connector 4 is mounted on the main board 2, the second spring part 16 is separated from the main board 2.

In the plurality of contacts 5, when the spring piece 12 receives a load from the sub-board 3 and thereby the contact part 13 is displaced downward, the first spring part 15 is deformed and the second spring part 16 is deformed in contact with the main board 2.

Figure 6:
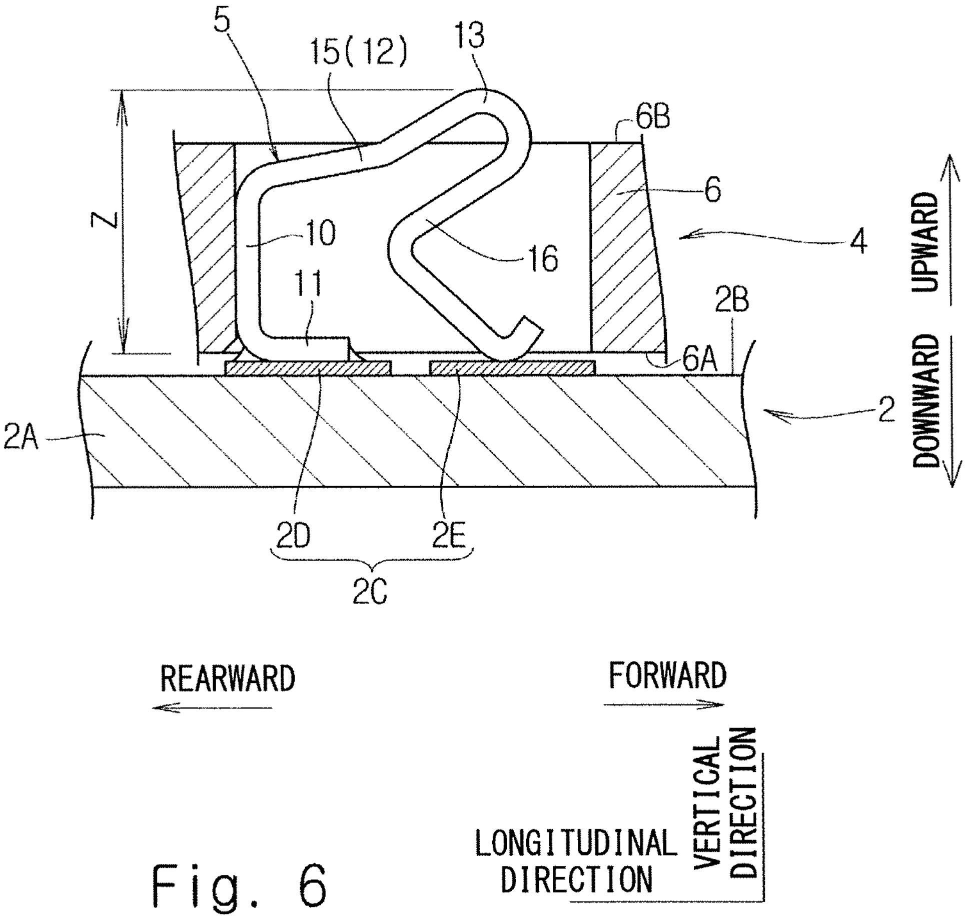
FIG. 6 is a view showing usage of the board-to-board connector.

In at least any one of the plurality of contacts 5, after a load is removed and the contact part 13 is displaced upward as shown in FIG. 6, the second spring part 16 remains in contact with the main board 2.

This structure allows the height position Z of the contact part 13 when a load on the contact 5 is removed to be closer to the initial position Z0.

Note that, in this embodiment, in at least any one of the plurality of contacts 5, the second spring part 16 remains in contact with the main board 2 after a load is removed and the contact part 13 is displaced upward. Alternatively, in all of the plurality of contacts 5, the second spring part 16 may remain in contact with the main board 2 after a load is removed and the contact part 13 is displaced upward as shown in FIG. 6.

The above-described technical effect that allows the height position Z of the contact part 13 when a load on the contact 5 is removed to be closer to the initial position Z0 would improve the coplanarity of the contact parts 13 of the plurality of contacts 5 in the state shown in FIG. 6. Further, the above-described technical effect would contribute to improving the wiping action.

Further, as shown in FIG. 4, the second spring part 16 includes the bending part 16C. This structure allows the spring length of the second spring part 16 to be sufficiently long. Although the second spring part 16 includes one bending part 16C in this embodiment, the second spring part 16 may include a plurality of bending parts 16C.

Further, as shown in FIG. 4, the second spring part 16 includes the curved part 16D that is configured to come into contact with the main board 2 and convex downward. In this structure, the second spring part 16 slides in the longitudinal direction when the second spring part 16 comes into contact with the main board 2, which achieves smooth elastic deformation of the second spring part 16.

Further, as shown in FIG. 4, the fixed part 10 is fixed to the housing 6 by press-fitting. Alternatively, the fixed part 10 may be fixed to the housing 6 by insert molding.

Modified Example

The above-described embodiment may be modified as follows, for example.

Figure 8:
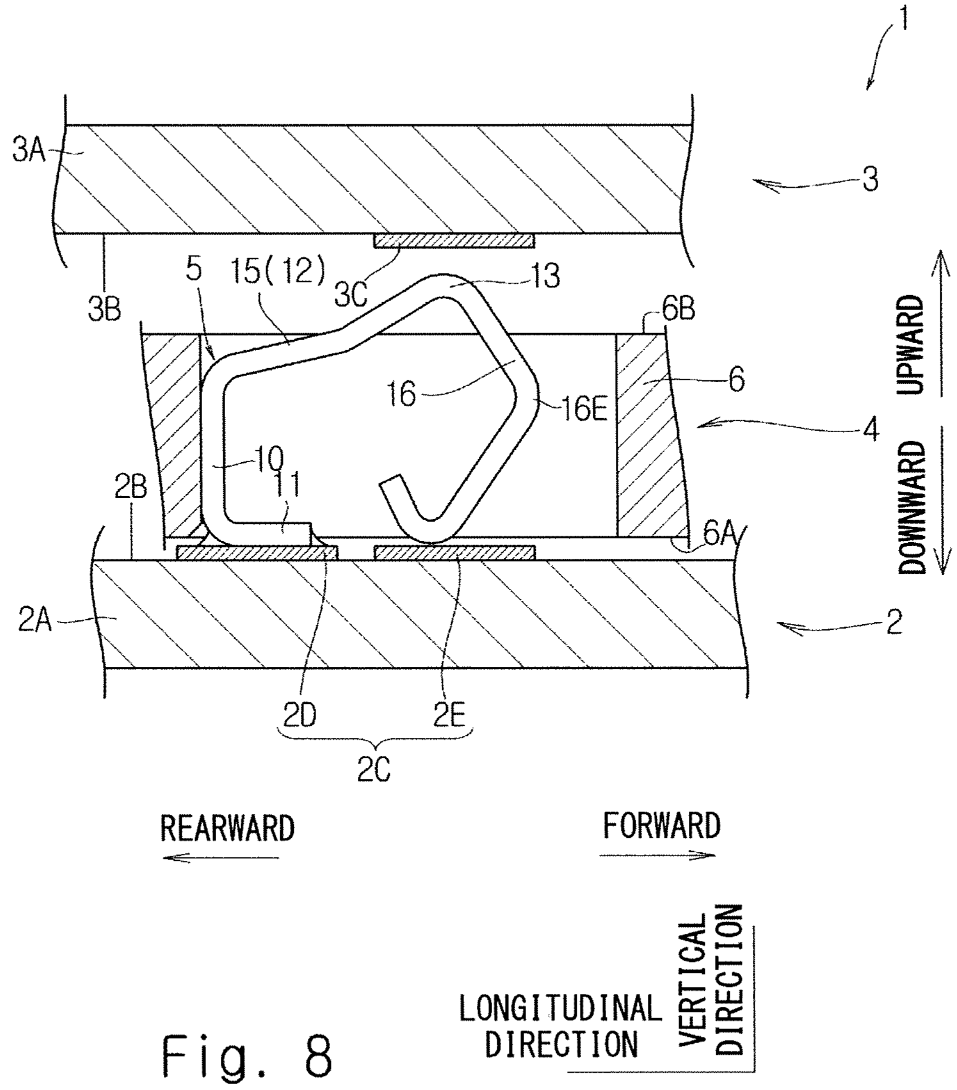
FIG. 8 is a view showing usage of a board-to-board connector (comparative example)
Figure 9:
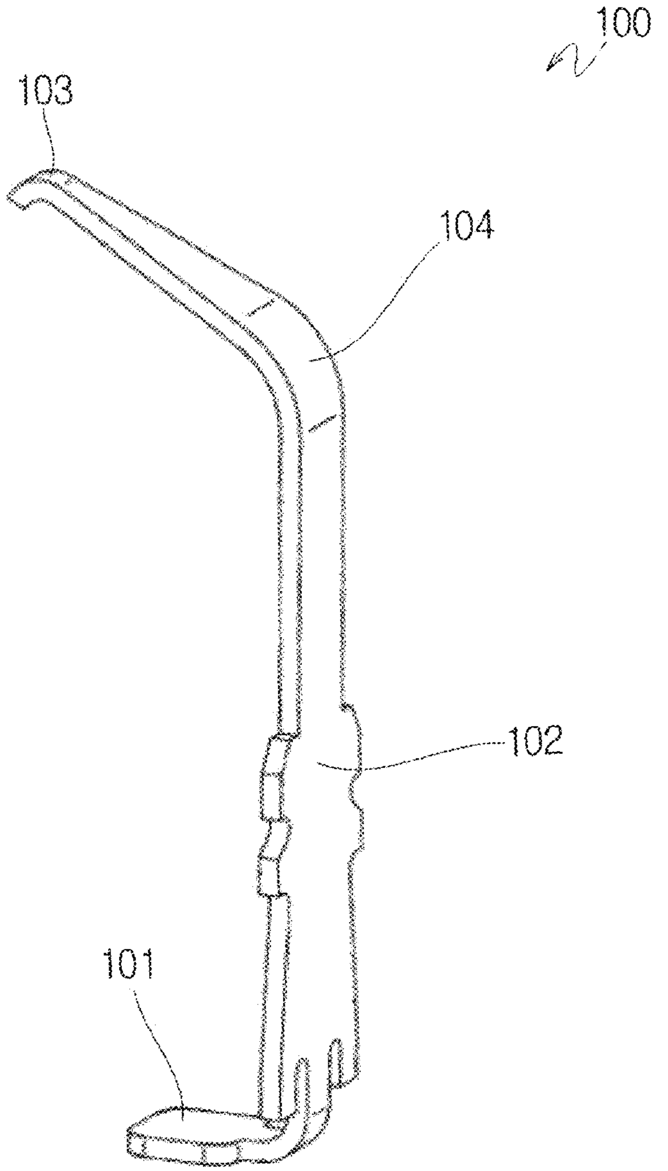
FIG. 9 is a view showing a simplified version of FIG. 1 of Patent Literature 1.

As shown in FIG. 4, in this embodiment, the second spring part 16 includes the bending part 16C that bends convex rearward. Alternatively, as shown in FIG. 8, the second spring part 16 may include a bending part 16E that bends convex forward. This structure also allows the spring length of the second spring part 16 to be sufficiently long.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A board-to-board connector mounted on a first board and interposed between the first board and a second board to electrically connect a plurality of first electrode pads of the first board and a plurality of second electrode pads of the second board, respectively, comprising:

a plurality of contacts; and a housing holding the plurality of contacts, wherein the housing includes a housing lower surface configured to be opposed to the first board and a housing upper surface configured to be opposed to the second board, each contact includes a fixed part to be fixed to the housing, a mounting part projecting from the fixed part and solderable to a corresponding first electrode pad, and a spring piece extending from the fixed part and having a contact part configured to come into contact with a corresponding second electrode pad, the spring piece of each contact includes a first spring part extending between the contact part and the fixed part, and a second spring part extending from the contact part in a direction of viewing the housing lower surface from the housing upper surface, in the plurality of contacts, when the board-to-board connector is mounted on the first board, the second spring part is separated from the first board, in the plurality of contacts, when the spring piece receives a load from the second board and thereby the contact part is displaced in the direction of viewing the housing lower surface from the housing upper surface, the first spring part is deformed, and the second spring part is deformed in contact with the first board, and in at least any one of the plurality of contacts, after the load is removed and thereby the contact part is displaced in a direction of viewing the housing upper surface from the housing lower surface, the second spring part remains in contact with the first board.

2. The board-to-board connector according to claim 1, wherein the second spring part includes at least one bending part.

3. The board-to-board connector according to claim 1, wherein the second spring part includes a curved part configured to come into contact with the first board and being convex in the direction of viewing the housing lower surface from the housing upper surface.

4. The board-to-board connector according to claim 1, wherein the fixed part is fixed to the housing by press-fitting.

5. The board-to-board connector according to claim 1, wherein the fixed part is fixed to the housing by insert molding.

* * * * *